(12) United States Patent
Zuo et al.

(10) Patent No.: US 9,604,660 B1
(45) Date of Patent: Mar. 28, 2017

(54) FOLDABLE STROLLER TO FORM A TROLLEY

(71) Applicant: Dongguan Master Kids Products Co., Ltd., Guangdong (CN)

(72) Inventors: Jiang-Wen Zuo, Xinning County (CN); Yi-Liang Zhang, Xinning County (CN)

( * ) Notice: Subject to any disclaimer, the term of this patent is extended or adjusted under 35 U.S.C. 154(b) by 0 days.

(21) Appl. No.: 14/877,936

(22) Filed: Oct. 8, 2015

(51) Int. Cl.
  *B62B 7/12* (2006.01)
  *B62B 7/06* (2006.01)
  *B62B 9/20* (2006.01)

(52) U.S. Cl.
  CPC .................. *B62B 7/12* (2013.01); *B62B 7/06* (2013.01); *B62B 9/20* (2013.01)

(58) Field of Classification Search
  CPC .. B62B 7/06; B62B 7/12; B62B 7/123; B62B 7/126; B62B 9/00; B62B 9/20
  See application file for complete search history.

(56) References Cited

U.S. PATENT DOCUMENTS

| | | | | |
|---|---|---|---|---|
| 2,435,733 A | * | 2/1948 | Belyeu | B60N 2/2848 280/30 |
| 4,412,689 A | * | 11/1983 | Lee | B62B 7/10 211/172 |
| 5,125,674 A | * | 6/1992 | Manuszak | B62B 7/12 280/30 |
| 5,213,360 A | * | 5/1993 | Lin | A47D 1/02 280/30 |
| 5,356,197 A | * | 10/1994 | Simic | A47C 13/00 280/204 |
| 6,016,893 A | * | 1/2000 | Chen | A45C 5/14 190/1 |
| 8,794,659 B1 | * | 8/2014 | Palmer | B62B 7/105 280/648 |
| 2004/0251717 A1 | * | 12/2004 | Tamura | A45C 15/00 297/17 |
| 2008/0042474 A1 | * | 2/2008 | Dickie | B62B 7/06 297/16.2 |
| 2009/0315300 A1 | * | 12/2009 | Stiba | B62B 7/10 280/648 |

* cited by examiner

*Primary Examiner* — Frank Vanaman
(74) *Attorney, Agent, or Firm* — Prakash Nama; Global IP Services, PLLC

(57) ABSTRACT

A foldable stroller capable of being formed into a trolley, comprising a front tube, a rear tube, a seat frame, an armrest, a pushing lever, and a handle connected to the pushing lever via a second joint assembly which allows pivotal movement of the handle relative to the pushing lever; the front tube having an extensible draw bar; wherein when the rear tube, seat frame, armrest and pushing lever are folded toward the front tube by joints, the handle is pivotally moved at 90-100 degrees relative to the pushing lever through the second joint assembly, an then the draw bar is pulled out of the front tube, whereby the trolley is formed; the foldable stroller can be folded in a small size and is easy to carry and store, moreover, if the baby has grown up, the stroller can be used as the trolley to avoid unnecessary waste.

5 Claims, 3 Drawing Sheets

FOLDABLE STROLLER TO FORM A TROLLEY

FIELD OF THE INVENTION

The present invention relates to a stroller, particularly to a foldable stroller capable of being formed into a trolley.

BACKGROUND OF THE INVENTION

The stroller is a carrying transportation for babies, which is very convenient when the parent is going out with babies, so the stroller is very popular among the consumers The traditional, baby stroller includes a joint assembly, a front tube installed on the joint assembly, a rear tube, a seat frame, an armrest, and a pushing rod; the front and rear tube respectively having front and rear wheels; the pushing rod provided, with a handle and the seat frame provided with a seat cover. The front tube, rear tube, seat frame, armrest, and pushing rod can be stretched to each other when the stroller is used, and the stroller can be folded when not in use for easy storage.

However, the function of the traditional stroller is only for carrying babies, the babies grow up, the stroller can no longer continue to be used, which would cause unnecessary waste.

SUMMARY OF INVENTION

The objective of the present invention is to overcome the above mentioned disadvantages by providing a foldable stroller capable of being formed into a trolley that comprises a front tube, a rear tube pivotally connected to the front tube via a joint which allows pivotal movement of the rear tube relative to the front tube, a seat frame, an armrest, a pushing lever installed on the rear tube via a first joint assembly, and a handle connected to the pushing lever via a second joint assembly which allows pivotal movement of the handle relative to the pushing lever; the front tube and the rear tube respectively having a front wheel and a rear wheel, and the front tube having an extensible draw bar; wherein when the rear tube, seat frame, armrest and pushing lever are folded toward the front tube by the joints, the handle is pivotally moved at 90-100 degrees relative to the pushing lever through the second joint assembly and then the draw bar is pulled out of the front tube, whereby the trolley is formed.

Wherein the handle is pivotally moved at 90-100 degrees relative to the pushing lever, which is formed as an L-shaped supporting frame.

Wherein the armrest and the rear tube are jointed with the front tube by a linkage assembly.

wherein the linkage assembly comprises a slide bushing connected with the front tube in a sliding manner and pivotally coupled to ends of a first and second rod, the other ends of the first and second rod respectively connected with the armrest and the rear tube.

Wherein the second joint assembly includes a locking device and an unlocking button disposed in an outer side of the second joint assembly.

The present invention not only is a stroller, but also is used as a trolley, which can be folded in a small size and is easy to carry and store, moreover, if the baby has grown up, the stroller can be used as the trolley to avoid unnecessary waste.

DETAILED DESCRIPTION OF THE PREFERRED EMBODIMENTS

Figure 1:
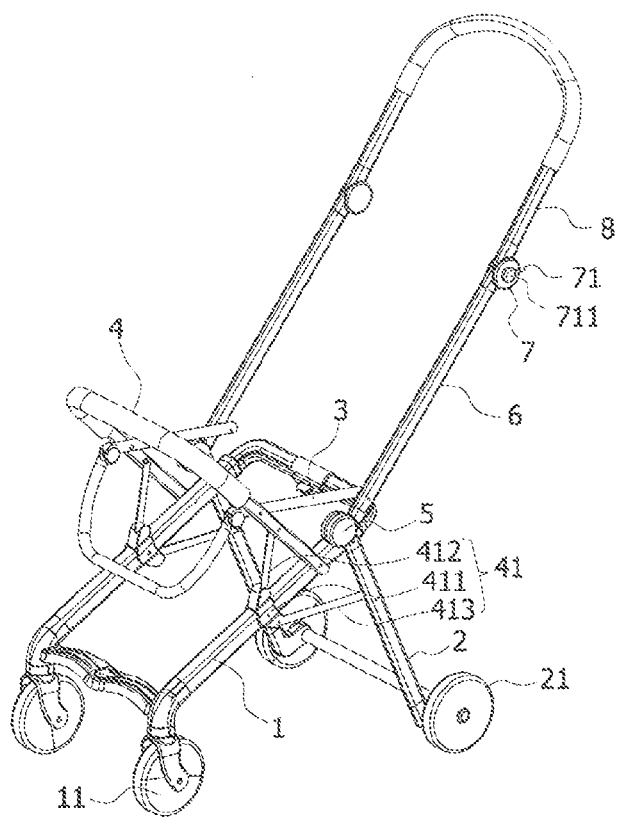
FIG. 1 is a perspective view of the present invention when the stroller is unfolded.
Figure 2:
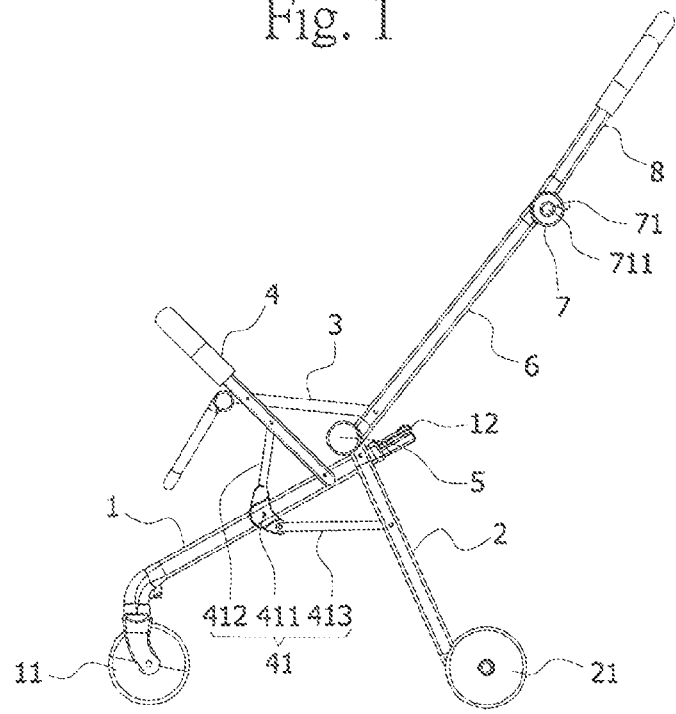
FIG. 2 is a left side elevation view of the present invention when the stroller is unfolded.
Figure 3:
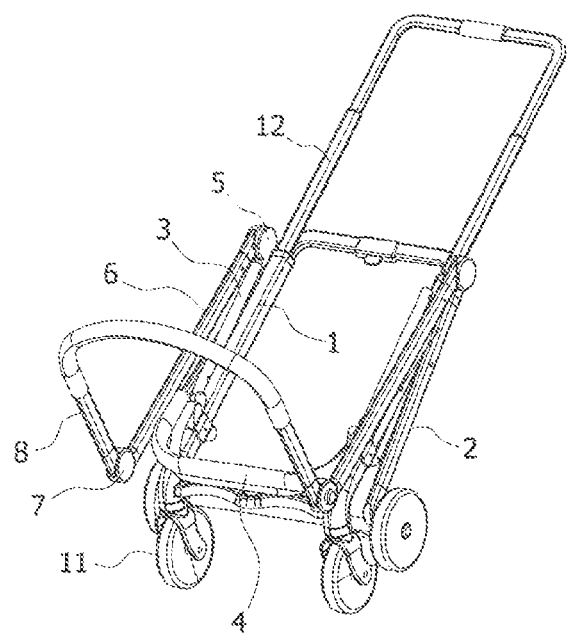
FIG. 3 is a perspective view of the present invention showing the stroller being folded and formed into a trolley.
Figure 4:
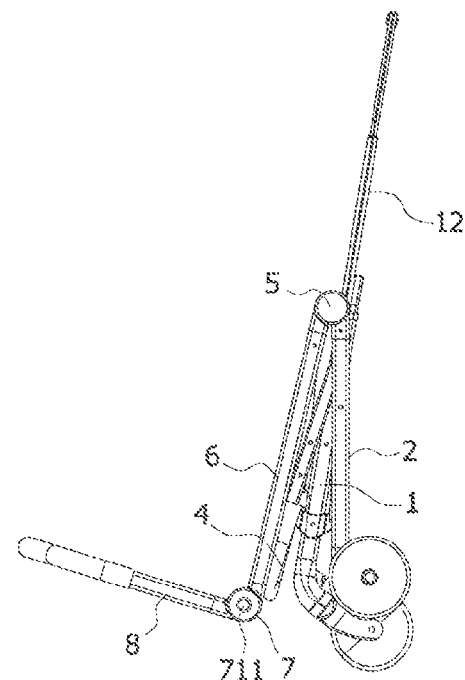
FIG. 4 is a left side elevation view of the present invention showing the stroller being folded and formed into the trolley.

The invention will now be described in connection with certain preferred embodiments with reference to the above mentioned illustrative figures so that it may be more fully understood.

Referring to FIG. 1-4, A foldable stroller capable of being formed into a trolley, comprising a front tube (1), a rear tube (2) pivotally connected to the front tube (1) via a joint which allows pivotal movement of the rear tube (2) relative to the front tube (1), a seat frame (3), an armrest (4), a pushing lever (6) installed on the rear tube (2) via a first joint assembly (5), and a handle (8) connected to the pushing lever (6) via a second joint assembly (7) which allows pivotal movement of the handle (8) relative to the pushing lever (6); the front tube (1) and the rear tube (2) respectively having a front wheel (11) and a rear wheel (21), and the front tube having an extensible draw bar (12); wherein when the rear tube (2), seat frame (3), armrest (4) and pushing lever (6) are folded toward the front tube (1) by the joints, the handle (8) is pivotally moved at 90-100 degrees relative to the pushing lever (6) through the second joint assembly (7), and then the draw bar (12) is pulled out of the front tube, whereby the trolley is formed.

Wherein the extensible draw bar (12) can be contracted along and stored in the front tube (1) when not using it, so that the extensible draw bar (12) will not affect the normal use of the stroller.

Wherein the armrest (4) and the rear tube (2) are jointed with the front tube (1) by a linkage assembly (41). When the stroller is unfolded for use, the linkage assembly (41) is used as a support to the armrest (4), rear tube (2), and front tube (1); besides, when the stroller is not in use, the linkage assembly (41) drives the armrest (4) and the rear tube (2) to be easily folded toward front tube (1).

wherein the linkage assembly (41) comprises a slide bushing (411) connected with the front tube (1) in a sliding manner and pivotally coupled to ends of a first and second rod (412, 413), the other ends of the first and second rod (412, 413) respectively connected with the armrest (4) and the rear tube (2).

wherein the second joint assembly (7) includes a locking device (71) and an unlocking button (711) disposed in an outer side of the second joint assembly (7). When the handle (8) needs to pivotally move toward the pushing lever (6), the unlocking button (711) is pressed to unlock the locking device (71) and rotate the second joint assembly (7); when the locking button (711) is released, the locking device (71) locks to fix the second joint assembly (7) again.

Figure 5:
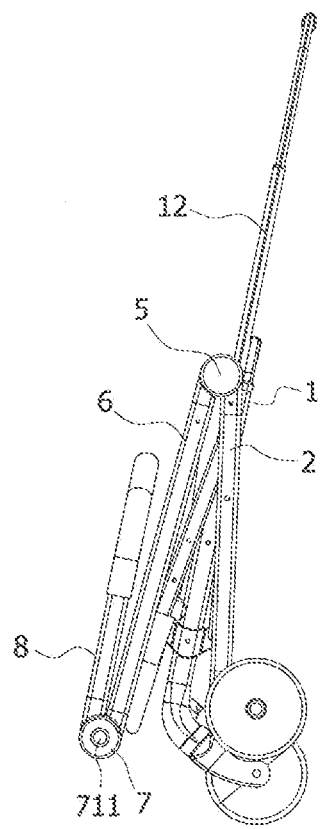
FIG. 5 is a schematic view of the present invention when the trolley is folded,.

The steps to form a trolley from the stroller comprise:
folding the rear tube (2), seat frame (3), armrest (4) and pushing lever (6) toward the front tube (1);
pressing the locking button (711) arranged in the outer of the second joint assembly (7);

pivotally moving the handle (8) toward the pushing lever (6) at 90-100 degrees relative to the pushing lever (6) through the second joint assembly (7); releasing the locking button (711) to fix the handle (8) relative to the pushing lever (6) and form a L-shaped supporting frame;

finally, pulling the draw bar (12) to form the trolley. Wherein the supporting frame forms a loading space which can load a box or other object within 20 kilograms. The handle (8) can be pivotally moved toward the pushing lever (6) to reduce the trolley's size as shown in FIG. 5.

The present invention not only is a stroller, but also is used as a trolley, which can be folded in a small size and is easy to carry and store, moreover, if the baby has grown up, the stroller can be used as the trolley to avoid unnecessary waste.

It will be evident to those skilled in the art that the invention is not limited to the details of the foregoing illustrated embodiments and that the present invention may be embodied in other specific forms without departing from the spirit or essential attributes thereof The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A foldable stroller capable of being formed into a trolley, comprising a front tube (1), a rear tube (2) pivotally connected to the front tube (1) via a joint which allows pivotal movement of the rear tube (2) relative to the front tube (1), a seat frame (3), an armrest (4), a pushing lever (6) installed on the rear tube (2) via a first joint assembly (5), and a handle (8) connected to the pushing lever (6) via a second joint assembly (7) which allows pivotal movement of the handle (8) relative to the pushing lever (6); the front tube (1) and the rear tube (2) respectively having a front wheel (11) and a rear wheel (21), and the front tube having an extensible draw bar (12); wherein when the rear tube (2), seat frame (3), armrest (4) and pushing lever (6) are folded on the front tube (1) by the joints, the handle (8) is pivotally moved at 90-100 degrees relative to the pushing lever (6) through the second joint assembly (7), and then the draw bar (12) is pulled out of the front tube, whereby the trolley is formed.

2. The foldable stroller of claim 1, wherein the handle is pivotally moved at 90-100 degrees relative to the gushing lever (6), which is formed as an L-shaped supporting frame.

3. The foldable stroller of claim 1, wherein the armrest (4) and the rear tube (2) are jointed with the front tube (1) by a linkage assembly (41).

4. The foldable stroller of claim 3, wherein the linkage assembly (41) comprises a slide bushing (411) connected with the front tube (1) in a sliding manner and pivotally coupled to ends of a first and second rod (412, 413) the other ends of the first and second rod (412, 413) respectively connected with the armrest (4) and the rear tube (2).

5. The foldable stroller of claim 1, wherein the second joint assembly (7) includes a locking device (71) and an unlocking button (711) disposed in an outer side of the second joint assembly (7).

* * * * *